Patented Aug. 16, 1932

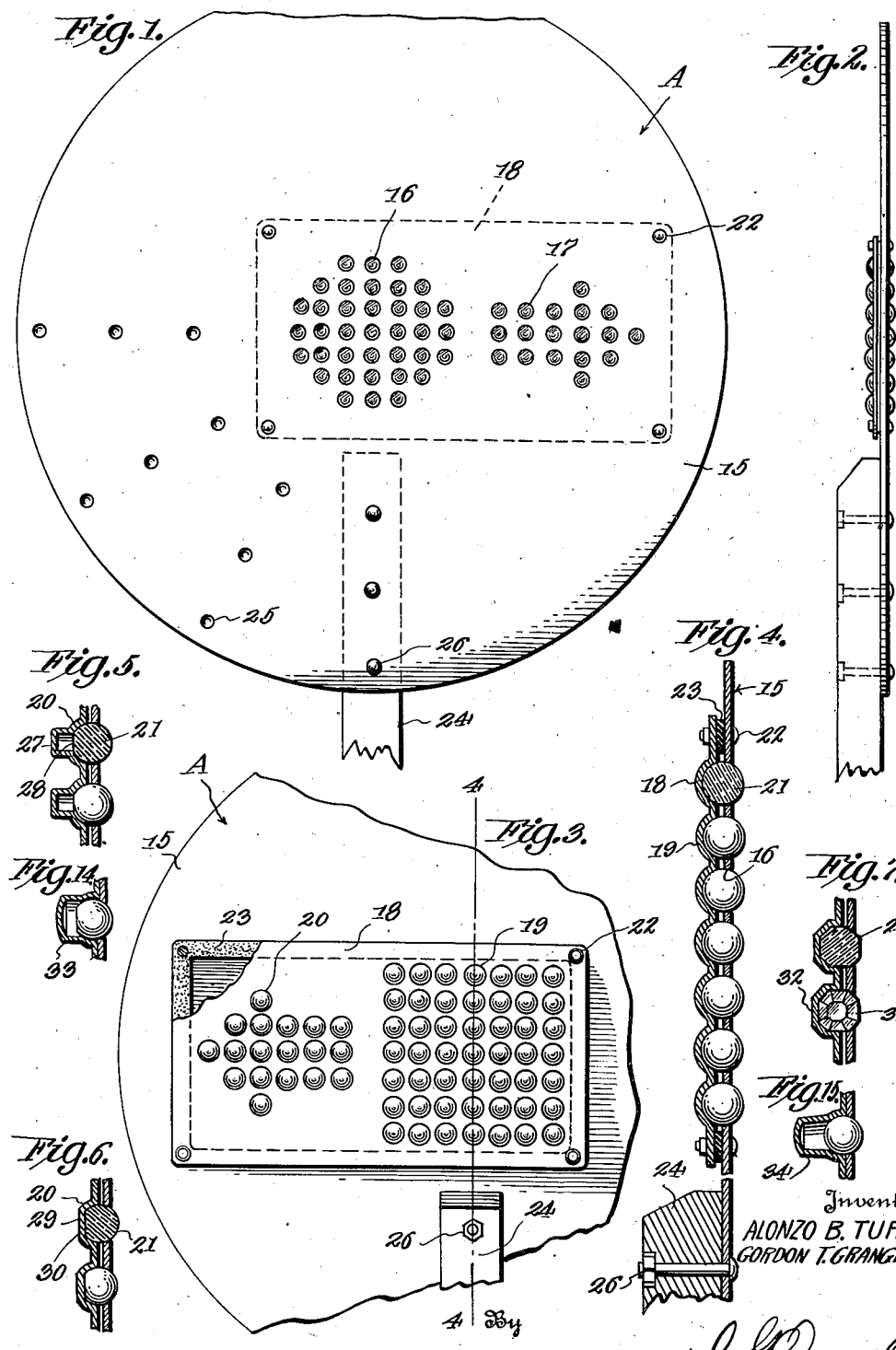

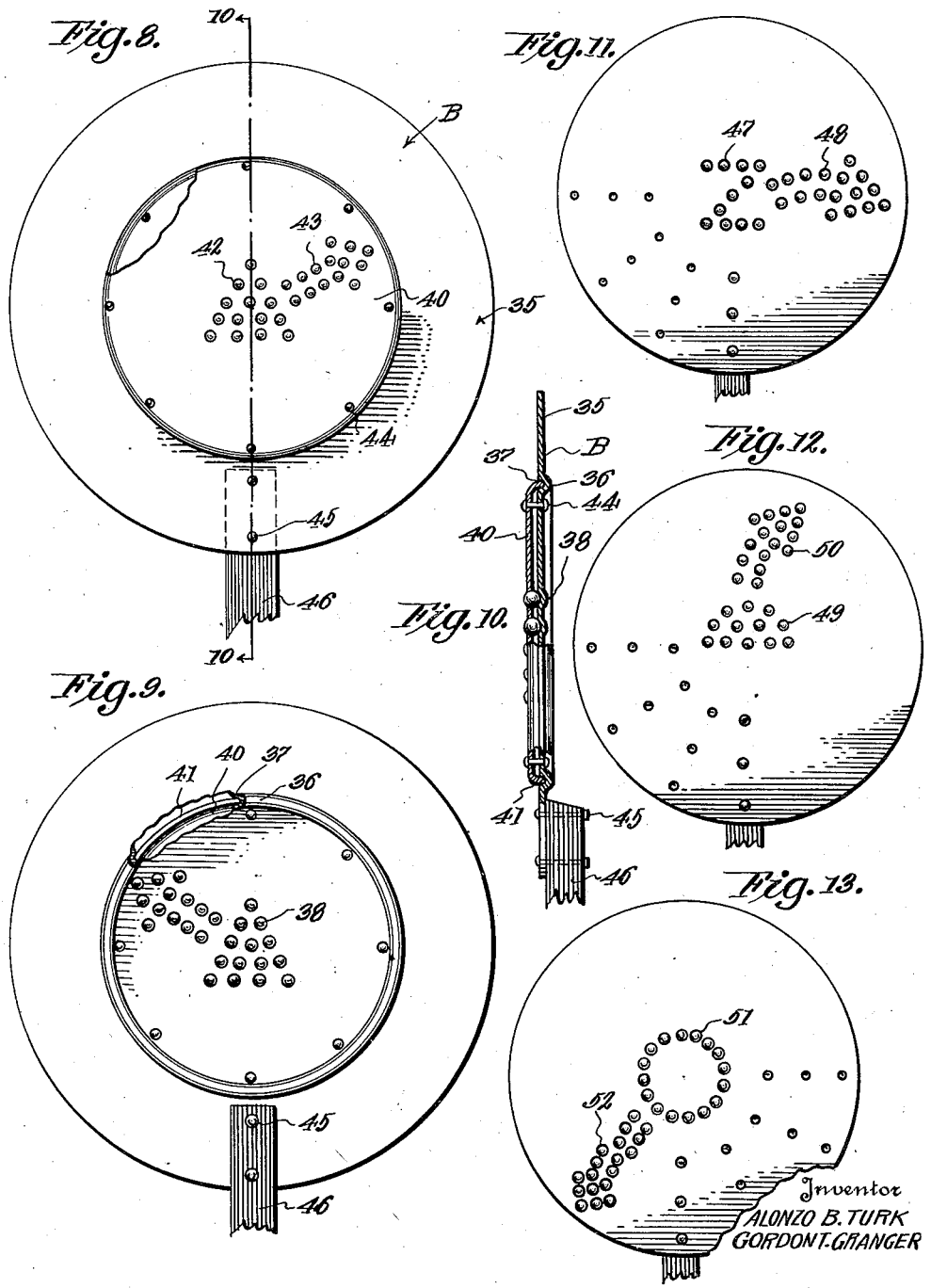

1,871,467

UNITED STATES PATENT OFFICE

ALONZO B. TURK AND GORDON T. GRANGER, OF OKMULGEE, OKLAHOMA

DIRECTION INDICATOR

Application filed August 13, 1930. Serial No. 475,082.

This invention appertains to devices for the reflection of outside lights from bodies of light reflecting material and more particularly to improvements in highway signals of the type utilizing reflected light, the device being susceptible for other uses.

One of the primary objects of our invention is to provide an improved means for the reflection of outside light from bodies of light reflecting material by the ingenious method of the placing of the light reflecting material in an apparatus so that the outside light will reflect back the light ray to the source of the outside light.

It has heretofore been contemplated of using reflectors for highway signal purposes but no intelligent application of the reflector principle has been used and consequently the reflected rays emanate from all different angles.

Another salient object of our invention is the provision of novel means for holding a plurality of reflecting elements of special character between a pair of plates, in such a manner that all of the reflecting elements will be firmly held and be permitted to function with the maximum amount of benefits.

A further important object of our invention is the provision of means whereby different insignia representing conventional railroad or highway safety signals, direction signals, and the like can be made, one of said plates having a plurality of sockets therein for receiving the reflecting elements and the other plate having openings therein forming the different designs for clamping the reflecting element in the sockets and for permitting the reflecting element to protrude a predetermined distance through the openings or perforations.

A further object of our invention is the provision of means whereby the plates can be adjusted axially one relative to the other so that indicia matter can be placed in the desired position for indicating a desired turn in the road.

A further object of our invention is the provision of means for arranging the plates whereby rain and the like will be precluded from between the plates and collecting therein.

A still further object of our invention is to provide an improved highway safety signal of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a front elevation of a device embodying one form of our invention.

Figure 2 is an edge elevation of the same.

Figure 3 is a fragmentary rear elevation of the device shown in Figure 1 with parts thereof broken away and in section.

Figure 4 is an enlarged vertical sectional view taken on the line 4—4 of Figure 3.

Figure 5 is an enlarged fragmentary detail sectional view illustrating a slightly modified form of socket for the reflecting element and a slightly modified form of the reflecting element.

Figure 6 is a view similar to Figure 5 showing a still further modified form of socket and reflecting element.

Figure 7 is an enlarged fragmentary detail sectional view illustrating a still further modified form of socket and reflecting element.

Figure 8 is a front elevation showing another form of our improved device.

Figure 9 is a rear elevation of the device shown in Figure 8.

Figure 10 is a vertical section through the same taken on the line 10—10 of Figure 8 looking in the direction of the arrows.

Figure 11 is a front elevation showing the uses of different highway direction indicia.

Figures 12 and 13 are front elevational views illustrating the use of different direction indicia.

Figures 14 and 15 are enlarged fragmentary sectional views illustrating further modified forms of sockets.

Referring to the drawings in detail, wherein similar reference characters designate corresponding parts throughout the several views, the letter A generally indicates one form of our invention and the principle of our invention has been shown incorporated in a highway indicating safety signalling device.

In the form A of the invention, the device may comprise a main body plate 15 of metal of the desired gage suitably painted, enameled or otherwise treated to present an attractive appearance. This body plate 15 can be of any desired shape and as shown the same is of a circular shape in front elevation. The axial center of the plate can be provided with a plurality of perforations 16 arranged in circular formation and at one side of the circular arrangement of perforations 16 is a series of perforations 17, which are arranged to present the appearance of an arrow. While in Figure 1 I have shown the plate provided with perforations 16 at its center arranged in substantially circular formation and perforations 17 at one side thereof arranged to form an indicating arrow, it is to be understood that other designs can be made on the plates by perforating the same so as to represent other indicating matter. Disposed in rear of the body plate 15 is a back or clamping plate 18 which can be of a smaller size than the plate 15. This plate 18 is provided with a series of sockets 19 and a series of sockets 20, the plate 18 being positioned in rear of the plate 15 in such a manner that the series of sockets 19 will lie in rear of the series of openings 16 and the series of sockets 20 in rear of the openings 17. If preferred, the entire plate 18 can be provided with sockets or depressions.

The body plate 15 and the back or clamping plate 18 receives therebetween the reflecting elements 21, which can be in the nature of spheres formed of flint-glass, quartz, plate glass or the like of any desired color. The series of openings 16 and 17 are of such a size that a portion of the reflecting element 21 will protrude therethrough, the openings being of a less diameter than the diameter of the reflecting elements so that the elements can not fall therethrough and these elements are seated in the depressions or sockets 19 and 20. The plates 15 and 18 are clamped together in any preferred way, such as by the use of bolts 22 and a sealing compound 23 can be placed between the plates in order to keep out the elements, such as rain, snow, and the like, which would tend to rust the plates. In lieu of a sealing compound, a gasket can be placed between the plates adjacent to the edges thereof.

The body plate 15 can be secured to a suitable standard 24 which can be imbedded in the ground. If preferred the body plate can have a series of radially disposed openings 25 so that the plate 15 can be swung around its axis to bring any row of the radial openings 25 in alignment with the post 24 to permit the plate to be bolted thereto by means of bolts 26 in any desired position on the post. This permits the indicating arrow to be swung to different points around the axis of the plate to indicate different turns or directions.

The sockets 19 and 20 can take different forms and in Figures 5 and 6 I have shown modified forms of sockets. In Figure 5 the rear walls of the sockets are provided with rearwardly extending cups 27 and the rear faces of the reflecting elements 21 are provided with flat faces 28.

In Figure 6 the rear walls of the sockets are provided with flat faces 29 and the rear portions of the reflecting elements are provided with flat contacting faces 30.

In Figures 14 and 15, I have shown the sockets provided respectively with deep wells 33 and 34, so as to allow the rear wall to extend an appreciatable distance beyond the reflecting element. This will allow certain light rays to be thrown back.

The spherical-plano reflecting elements cause a dispersion of the light to take place and therefore the efficiency of the road sign is increased. Also, the curvature of the reflectors for the lens and the fact that the front faces of the lenses are of a reduced diameter causes a wider distribution of the reflected light rays.

Likewise the reflecting elements themselves can take different forms and in Figure 7 of the drawings the reflecting elements are provided with facets 31 and the sockets are shaped to correspond thereto as indicated by the reference character 32.

As intimated, the invention is susceptible of a number of different forms or modifications and in Figures 8 to 10 inclusive I have shown another form or modification of the invention. This form is generally indicated by the reference character B and comprises a relatively large back or body plate 35 which can also be formed of metal of the desired gage. In the present instance this back or body plate 35 is shown to be of a circular configuration, but it is obvious that the same can be made in any preferred shape. In accordance with the modified form the back or body plate 35 is provided with an annular rearwardly struck rib 36 defining a seat 37 and the face of the plate 35 is provided with a plurality of rearwardly struck sockets 38 for the reception of the reflecting elements 39 which can take the form of balls or spheres. The back or body plate 35 receives the relatively small front or face plate 40, which, in the present instance is likewise of a circular shape, the periphery of the same being provided with a rearwardly projecting flange 41, which is received within the annular seat or groove 37 formed by the rearwardly struck groove 36. The face plate 40 is provided with series of openings 42 and 43 and these openings can be so formed as to provide any desired design, and as shown in Figure 8 the central design represents a pyramid while the side design represents an arrow. The openings 42 and 43 receive the reflecting balls 39 and these openings are of a less diameter than the diameter of the balls to prevent the same from falling out. The face plate 40 can be secured to the plate 35 in any preferred way such as by the use of rivets 44. It may be preferable to use rivets so that the plates will be permanently connected together whereby unauthorized persons will be prevented from mutilating the device. The body plate 35 is then bolted or otherwise secured as at 45 to a suitable supporting post 46 which can be imbedded or otherwise anchored in the ground.

It is to be also understood that the designs formed by the reflecting elements can take different forms to indicate different road turns, stops and the like and Figures 11 to 13 illustrate some of the different designs which can be used.

In Figure 11 the central design takes the form of the letter Z as indicated by the reference character 47 and the side of the sign takes the form of a curved arrow as indicated by the reference character 48.

In Figure 12 of the drawings the design takes the form of a half circle as indicated by the reference character 49 and the side sign takes the character of a curved arrow 50.

In Figure 13 of the drawings the central design takes the character of a ring as indicated by the reference character 51 and the side sign takes the character of a sinuous arrow 52.

From the foregoing description, it can be seen that we have provided an exceptionally simple device for reflecting back light, which will be rigid and strong and which can be manufactured at a low cost and give very desirable results.

Changes in details may be made without departing from the spirit or the scope of this invention, but what we claim as new is:

1. An apparatus for the reflection of light, a body plate having a series of central perforations therein forming a design, and a series of side perforations therein forming another design leading from the first design radially of the body plate and together with the first design forming a composite symbol, a clamping plate arranged in rear of the face plate and connected therewith having a plurality of indentations, reflecting elements clamped between said plates received in said indentations and partially projecting through said openings, a support extending back of the body plate, the body plate being formed with lines of openings extending radially of the plate, and fasteners passed through the support and a selected line of openings whereby the body plate may be secured to the support with the last mentioned design extending in a determined direction.

2. In an apparatus for the reflection of light, a body plate having a rearwardly struck rib defining a seat, the body plate being provided within the area defined by said rib, a plurality of rearwardly struck indentations, a clamping plate having a marginal flange received in said seat and provided with a plurality of perforations, means for locking the plates together, and reflecting elements clamped between said plates received in said indentations and partially projecting through said perforations.

3. In an apparatus for the reflection of outside light, a transparent body substantially spherical but having a flat face to provide opposed flat and semi-circular surfaces, and a reflector located in the rear of the flat face, the flat face having a diameter less than the diameter of the body.

In testimony whereof we affix our signatures.

ALONZO B. TURK.
GORDON T. GRANGER.